Sept. 7, 1926.  
H. J. K. SACHAU  
1,598,692  
FEED REGULATING APPARATUS FOR SAUSAGE FILLING MACHINES  
Filed Jan. 4, 1926

Inventor  
H.J.K. Sachau  
by  
Langner, Parry,  
Card + Langner  
Attys.

Patented Sept. 7, 1926.

1,598,692

UNITED STATES PATENT OFFICE.

HENRY JOHANNES KARL SACHAU, OF NEUMUNSTER, GERMANY.

FEED-REGULATING APPARATUS FOR SAUSAGE-FILLING MACHINES.

Application filed January 4, 1926, Serial No. 79,233, and in Germany January 10, 1925.

Feed regulating devices for sausage filling machines (sausage stuffers) have been heretofore devised having a working cylinder connected with a filling cylinder, in front of which operates a tubular piston which temporarily is in communication with a channel, by which the sausage-meat is fed, and which piston when a certain amount has passed, is rotated and then given a forward movement to force the material into the sausage skin or casing. While the feed regulating or portioning cylinder is being filled the outlet of this cylinder is closed by a special valve.

According to the present invention the sausage filling machine is simplified not only by avoiding the special valve but also in that the piston, which is preferably solid, is provided with a one-sided prolongation and is operated so that on the backward movement of the piston the prolongation closes the outlet opening arranged laterally on the working cylinder and at the same time uncovers the inlet opening which also is arranged laterally, while on the forward movement of the piston, after it has been rotated, the outlet opening is opened and the inlet opening closed. In this way an exactly predetermined amount of sausage material corresponding to the stroke of the piston is expelled each time, thus determining the size of the sausage. The required longitudinal motion of the piston is produced by an eccentric, mounted on the shaft transmitting the rotary movement, and is connected with the working piston by a bell crank lever. The eccentric may be adjustable to change the feed regulation or portioning at will.

Figure 1:
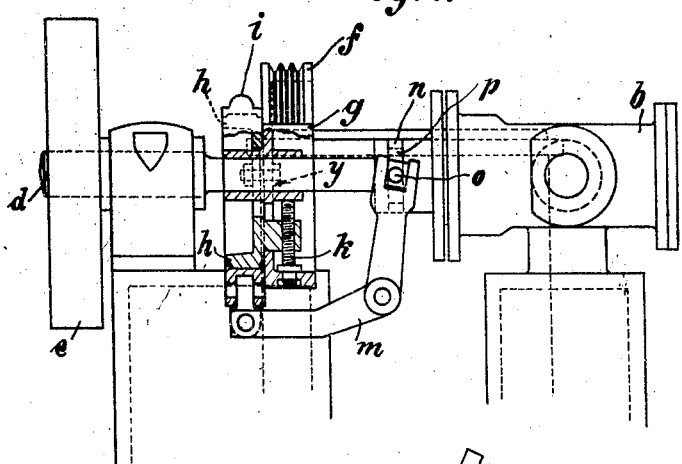
Figure 2:
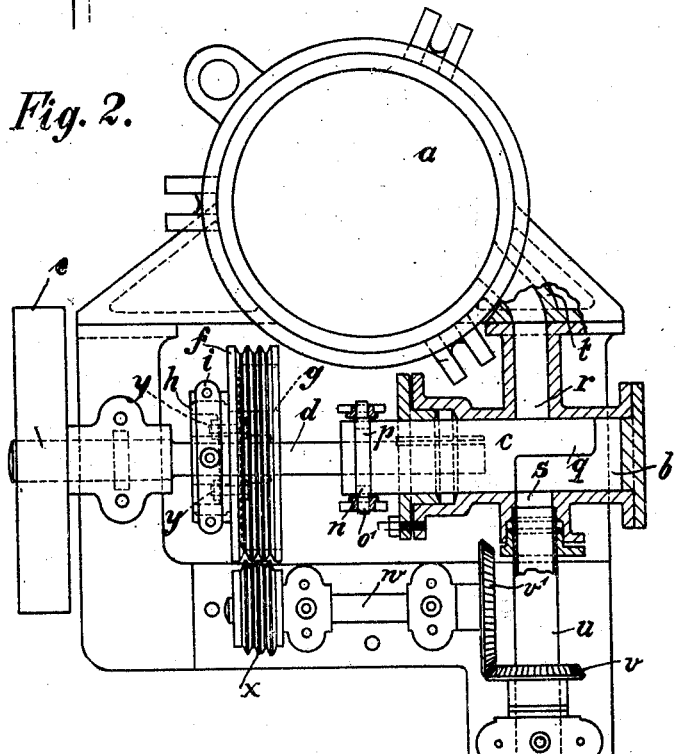

In the accompanying drawings, given by way of example only: Fig. 1 illustrates a feed regulating apparatus with parts shown in section, of a construction according to the invention, and Fig. 2 a plan of the same parts being shown in section.

In the construction shown the feed regulating device is arranged to one side of the filling cylinder $a$ and consists of a working or feed regulating cylinder $b$, within which a piston $c$ is adapted to rotate and to reciprocate. The rotation of the piston is effected by a shaft $d$ which is slidably but nonrotatably connected with the piston and may be rotatably driven by any suitable gearing such as a belt pulley $e$. A disc $f$ is firmly mounted on the shaft $d$ which for a purpose hereinafter more fully explained is constructed as a friction pulley having a flattened part $g$. An eccentric $h$ is connected with said disc and embraced by an eccentric strap $i$. The connection of the eccentric with the disc $f$ is carried out by a screw $k$ by rotation of which the eccentricity can be in position. By means of a bell crank lever $m$ the eccentric strap $i$ is in connection with a ring $n$, which slides in a groove $p$ of the piston $c$ and has studs $o$ engaged by said bell crank lever. By the aid of the eccentric the piston $c$ is given a reciprocating movement. The piston $c$ has a one-sided prolongation $q$ which is adapted to close the inlet opening $r$ in one position of the piston and the outlet $s$ in the other position. The filling clyinder $a$ is in communication with the inlet opening $r$ of the cylinder $b$ by a short tube $t$. The outlet $s$ opens out into a rotary tube $u$ which at its outer end is shaped to form a sausage nozzle, or else is provided with such nozzle $u'$. The sausage skin or other sausage casing $z$ to be filled with sausage meat can be slipped on to such nozzle $u'$ as is usual in sausage filling machines. For securing the necessary rotatability of the tube $u$ together with the nozzle $u'$, as is necessary to give the filled sausage the usual twist, the tube $u$ carries a bevel gear wheel $v$ engaging a like gear wheel $v'$ on the shaft $w$ on which is mounted a friction wheel $x$, that may be rotated by the above named friction disc $f$. The flattened part $g$ effects a temporary interruption of the driven wheel $x$ and thus also of the nozzle $u'$ while the shaft $d$ is being continuously rotated. The filling takes place during this interruption.

By the pressure in the filling cylinder $a$ the sausage meat is forced by way of the tube $t$ and the inlet $r$ into the working or feed regulating cylinder $b$ as long as the prolongation $q$ of the piston $c$ uncovers the inlet $r$. While the filling of the cylinder $b$ takes place the piston $c$ is rotated and the prolongation $q$ closes the outlet opening $s$. At this movement the piston $c$ is moved backwardly by the eccentric $h$ and the bell crank lever $m$, and this backward-movement is discontinued when the piston $c$ has rotated to such an extent, that the prolongation $q$ closes the inlet opening $r$ and uncovers the outlet opening $s$. Then the piston $c$ begins its return movement, that is to say its forward movement, and forces the sausage meat by way of the opening $s$ into the tube $u$, and finally by way of the nozzle $u'$ into the sausage skin $z$.

When the desired amount of sausage meat or the length of the desired sausages need be altered, all that is to be done is to adjust the screw $k$ after loosening the bolts $y$, which after adjusting the screw $k$, are again tightened.

I claim:

1. A feed regulating apparatus for sausage filling machines, comprising, a filling cylinder, a feed regulating cylinder, a piston arranged to rotate and to reciprocate within the regulating cylinder, an inlet opening and an outlet opening in the regulating cylinder, means connecting the inlet opening with the filling cylinder, a prolongation on one side of the piston, arranged upon rotation of the piston to alternatively open and close the inlet opening and the outlet opening, and, upon reciprocation of the piston, to force material from the regulating cylinder out through the outlet opening.

2. A feed regulating device according to claim 1, a rotary shaft slidably connected to the piston for rotating the piston, an eccentric mounted on the shaft, a bell crank lever operatively interconnecting the eccentric to the piston for reciprocating the piston on rotation of the shaft.

In testimony whereof I have signed my name to this specification.

HENRY JOHANNES KARL SACHAU.